US010885550B1

(12) United States Patent
Hoey et al.

(10) Patent No.: US 10,885,550 B1
(45) Date of Patent: Jan. 5, 2021

(54) GOODS/SERVICE RECOMMENDATION WITH DATA SECURITY

(71) Applicant: INTERNATIONAL BUSINESS MACHINES CORPORATION, Armonk, NY (US)

(72) Inventors: James Hoey, Poughkeepsie, NY (US); Chanchal Saha, Beacon, NY (US); William J. Green, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/514,960

(22) Filed: Jul. 17, 2019

(51) Int. Cl.
*G06Q 30/02* (2012.01)
*G06F 21/62* (2013.01)
*G06F 40/295* (2020.01)

(52) U.S. Cl.
CPC ..... *G06Q 30/0252* (2013.01); *G06F 21/6254* (2013.01); *G06F 40/295* (2020.01); *G06Q 30/0271* (2013.01)

(58) Field of Classification Search
CPC .................................................. G06Q 30/02
See application file for complete search history.

(56) References Cited

U.S. PATENT DOCUMENTS

| 6,604,079 B1 | 8/2003 | Ruvolo et al. |
| 8,234,676 B2 * | 7/2012 | Klein .............. H04N 21/25816 |
| | | 725/58 |
| 8,929,869 B2 * | 1/2015 | Scott ................. H04M 3/53383 |
| | | 455/414.1 |
| 9,646,288 B2 | 5/2017 | Price |
| 9,779,144 B1 | 10/2017 | Hampson et al. |

(Continued)

OTHER PUBLICATIONS

System and Method for advertising targeting based upon calendar integration with social media, Authors et.al.: Disclosed Anonymously An IP.com Prior Art Database Technical Disclosure. IP.com No. IPCOM000228669D, IP.com Electronic Publication Date: Jun. 28, 2013 (Year: 2013).*

(Continued)

*Primary Examiner* — Marilyn G Macasiano
(74) *Attorney, Agent, or Firm* — Law Offices of Ira D. Blecker, P.C.

(57) ABSTRACT

Goods/service recommendation that includes: accessing a consumer's computerized calendar to retrieve consumer calendar data and identifying an event in the calendar data; removing calendar data that is restricted data; determining first key words of the event representative of the event; identifying a target from the event; determining second key words of the target being descriptive of the target; determining third key words of the calendar data being descriptive of the consumer; combining the first, second and third key words; determining similarities and relationships between the target and the consumer to find groups of key words that form the strongest similarities and relationships; identifying the group of key words as having the strongest similarities and relationships between the target and the consumer; using the group of key words having the strongest similarities to identify a recommendation for providing a goods/service to the target; and providing the recommendation to the consumer.

20 Claims, 3 Drawing Sheets

(56) References Cited

U.S. PATENT DOCUMENTS

| | | | |
|---|---|---|---|
| 2007/0263825 A1* | 11/2007 | Shah | H04L 12/1818 |
| | | | 379/202.01 |
| 2008/0228548 A1 | 9/2008 | McBrearty et al. | |
| 2009/0307038 A1* | 12/2009 | Chakra | G06Q 10/109 |
| | | | 705/7.18 |
| 2011/0015991 A1 | 1/2011 | Fayyad et al. | |
| 2012/0259842 A1* | 10/2012 | Oman | G06Q 10/1093 |
| | | | 707/722 |
| 2013/0138507 A1 | 5/2013 | Kumar et al. | |
| 2014/0019243 A1* | 1/2014 | Cole | G06Q 30/0271 |
| | | | 705/14.54 |
| 2015/0339575 A1* | 11/2015 | Streit | G06F 16/9535 |
| | | | 706/48 |
| 2017/0147575 A1* | 5/2017 | Pappu | G06F 16/9014 |
| 2017/0372192 A1 | 12/2017 | Whritenor et al. | |
| 2018/0082260 A1* | 3/2018 | Dunn | G06Q 10/1093 |

OTHER PUBLICATIONS

Sudhakar Reddy M, A Method and System for Displaying Advertisements based on User Related Events, An IP.com Prior Art Database Technical Disclosure, IP.com No. IPCOM000209871D, IP.com Electronic Publication Date: Aug. 18, 2011 (Year: 2011).*
"Calendars as a Marketing Channel / Eventable", [online], [retrieved on May 9, 2019]. Retrieved from the Internet <URL: https//www.eventable.com/why-calendars/.

* cited by examiner

GOODS/SERVICE RECOMMENDATION WITH DATA SECURITY

BACKGROUND

The present exemplary embodiments pertain to recommendations for goods and/or service and, more particularly, pertain to a user receiving personalized marketing advertisements for goods and/or service for a person known to the user.

Typically, users receive marketing and sales emails/popup advertisements in browsers on goods and/or service to purchase their goods and/or service. These emails/popup advertisements are seen after a user may browse websites for goods and/or service. So, these marketing advertisements pop up based on the user's actions searching for goods and/or service.

Typical digital marketing strategies, i.e., search engine optimization, content marketing, email marketing, etc,. either need a direct search from a user or rely on a random guess to share advertisement contents with the user. Also, the current advertisements recommendations neither filter sensitive contents nor provide personalized advertisements recommendation for a person known to the user, referred to hereafter as the target.

It could be very helpful to a user to receive personalized marketing advertisement on goods/service recommendations for a target based on calendar insights and attention paid to data privacy without any direct inputs from consumers.

BRIEF SUMMARY

The various advantages and purposes of the exemplary embodiments as described above and hereafter are achieved by providing, according to an aspect of the exemplary embodiments, a method of goods/service recommendation comprising: accessing a consumer's computerized calendar to retrieve calendar data of the consumer and identifying at least one event in the calendar data; removing and discarding any calendar data that is data that is to be restricted from public disclosure; determining first key words of the event, the first key words being representative of the event; identifying a target from the event, the target being mentioned in the event; determining second key words of the target, the second key words being descriptive of the target; determining third key words of the calendar data, the third key words being descriptive of the consumer; combining the first, second and third key words; determining similarities and relationships between the target and the consumer to find groups of key words that form the strongest similarities and relationships; identifying the group of key words as having the strongest similarities and relationships between the target and the consumer; using the group of key words having the strongest similarities between the target and the consumer to identify a recommendation for providing a goods/service to the target; and providing the recommendation to the consumer for the goods/service to the target.

According to another aspect of the exemplary embodiments, there is provided a computer program product for goods/service recommendation comprising a computer readable storage medium having program instructions embodied therewith by a processor to cause the processor to perform a method comprising: accessing a consumer's computerized calendar by the processor to retrieve calendar data of the consumer and identifying at least one event in the calendar data; removing and discarding any calendar data by the processor that is data that is to be restricted from public disclosure; determining first key words of the event by the processor, the first key words being representative of the event; identifying a target from the event by the processor, the target being mentioned in the event; determining second key words of the target by the processor, the second key words being descriptive of the target; determining third key words of the calendar data by the processor, the third key words being descriptive of the consumer; combining the first, second and third key words by the processor; determining similarities and relationships between the target and the consumer by the processor to find groups of key words that form the strongest similarities and relationships; identifying the group of key words by the processor as having the strongest similarities and relationships between the target and the consumer; using the group of key words by the processor having the strongest similarities between the target and the consumer to identify a recommendation for providing a goods/service to the target; and providing the recommendation by the processor to the consumer for the goods/service to the target.

According to a further aspect of the exemplary embodiments, there is provided a system for goods/service recommendation comprising: a nontransitory storage medium; and a processor. The processor executes the instructions to perform the following functions: accessing a consumer's computerized calendar to retrieve calendar data of the consumer and identifying at least one event in the calendar data; removing and discarding any calendar data that is data that is to be restricted from public disclosure; determining first key words of the event, the first key words being representative of the event; identifying a target from the event, the target being mentioned in the event; determining second key words of the target, the second key words being descriptive of the target; determining third key words of the calendar data, the third key words being descriptive of the consumer; combining the first, second and third key words; determining similarities and relationships between the target and the consumer to find groups of key words that form the strongest similarities and relationships; identifying the group of key words as having the strongest similarities and relationships between the target and the consumer; using the group of key words having the strongest similarities between the target and the consumer to identify a recommendation for providing a goods/service to the target; and providing the recommendation to the consumer for the goods/service to the target.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The exemplary embodiments analyze structured and unstructured data from calendar events of one or more users, hereafter called consumers, that may be related to one another in some way. The analyzed data may be used to create a profile of a target by filtering private data, if any, from the analyzed data and provide goods and/or service recommendations to consumers for the target for upcoming events. The upcoming events may also be repeating events. The goods and/or service may be presented to the target as a gift. The target may be a person known to the consumer.

In the exemplary embodiments, there may be no direct input from the consumer such as browsing websites for goods and/or service that may be of interest to the target.

Current advertisement recommendations neither filter the consumer's private data nor provide personalized ads to the consumer for goods and/or service for the target.

The exemplary embodiments may provide advertisement recommendations without any consumer inputs, or any active or passive actions by the consumer, rather leveraging the consumers' calendar inputs.

The exemplary embodiments create a profile of a target by using consented data and recognizing private data and sensitive data of the consumer and the target. Data as used herein means digital data.

The exemplary embodiments look for similarities and relationships of the consumer and the target to create automated key words to trigger relevant marketing advertisements.

Private data as used herein may include any nonpublic data that a consumer or target may not wish to share with others. The private data may be marked with a restrictive marking such as, but not limited to, "private", "sensitive", "personal", "confidential" or "classified". Data, other than private data, may be shared with others without restriction unless restricted in some way by the consumer or target. One such restriction by the consumer or target may be "sensitive data" that may not be marked as or considered to be private data but the consumer or target may wish that this data not be publicly shared with others.

In one exemplary embodiment, all private data must be marked with a restrictive marking. Any data not marked with a restrictive marking is not to be considered as private data.

In another exemplary embodiment, all data is considered to be private data unless marked with a marking such as "not private data" or "public data".

Figure 1:
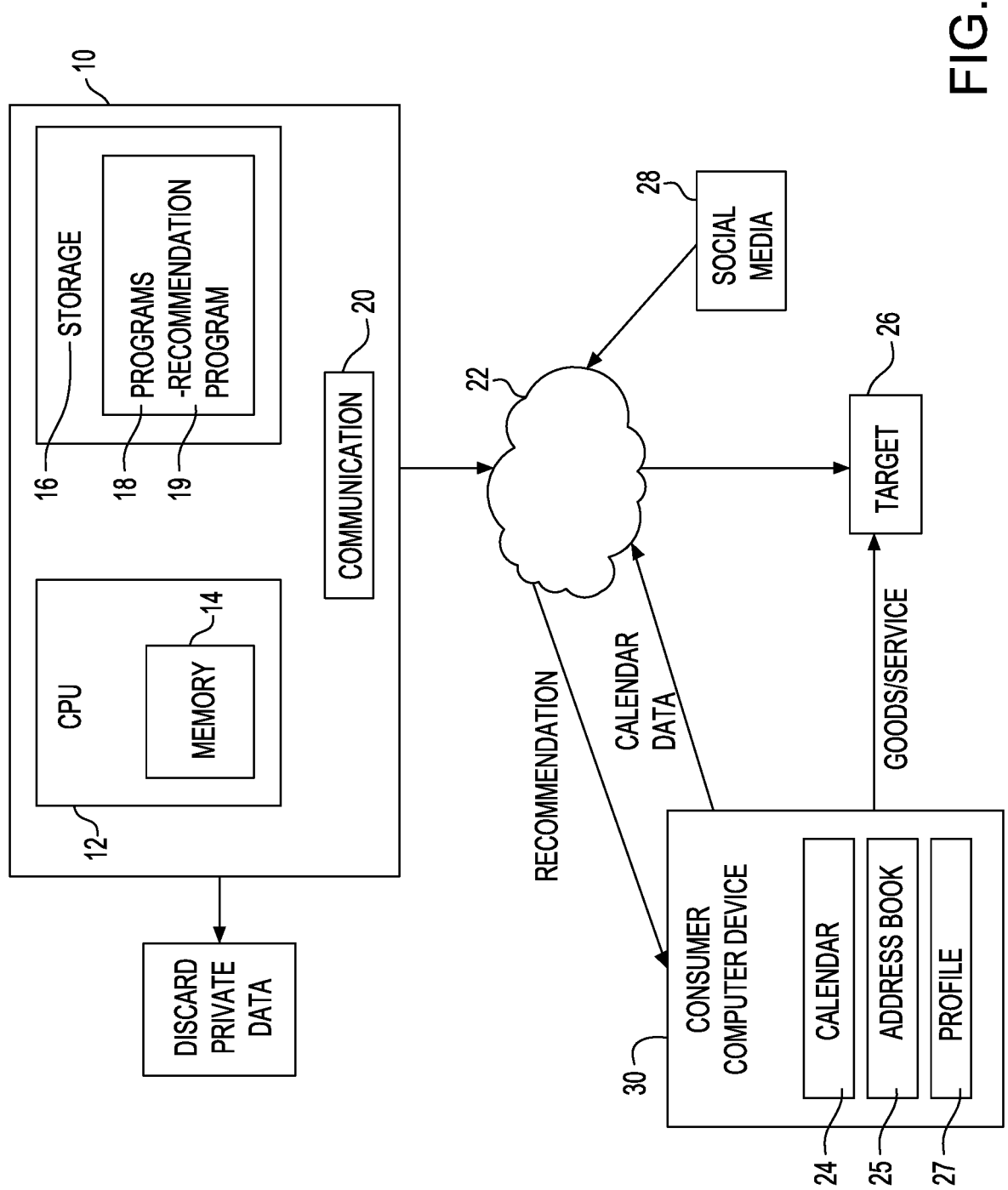
FIG. 1 is an overview of a computer system for implementing the exemplary embodiments.

Referring to the Figures in more detail, FIG. 1 is an overview of the exemplary embodiments. As illustrated in FIG. 1, in one exemplary embodiment, there is a computer system 10 having a central processing unit (CPU) 12 (also referred to as a processor) and memory 14. The computer system 10 may have storage 16 which may store programs 18. Storage 16 may be local storage on the computer system 10, such as a hard disk or solid state storage, or may be remotely located with respect to the computer system 10. The computer system 10 may additionally have communication means 20 such as WiFi, Bluetooth, satellite or wiring to connect with entities outside of the computer system 10 through, for example, the internet 22. Other instrumentalities that the computer system 10 may have are not mentioned here as they are not germane to the exemplary embodiments.

One of the programs 18 may be a recommendation program 19 to perform the exemplary embodiments. The computer system 10 through the internet 22 (or other communication means) communicates with the consumer through the consumer's calendar 24 to learn about events on the consumer's calendar 24. The consumer's calendar 24 may be hosted on a computer device 30 such as a smartphone, laptop, desk top or other computing system. The consumer through the consumer's computer device 30 may grant permission through conventional means for the computer system 10 to access the consumer's calendar 24. From the consumer's calendar 24, information about an event pertaining to a target 26 may be learned. Also information about the target 26, such as name, email, social media, etc. may be learned. Social media 28 may be accessed through the internet 22 (or other communication means) to learn further information about the consumer and the target 26, such as age, education, marital status, etc.

Any private data learned through any of the prior activities is discarded. Extra steps may be taken to securely discard the private data as further described below.

Through analyzing the calendar entry data and social media data, similarities and relationships between the consumer and the target 26 may be determined. From these similarities and relationships, one or more recommendations for the providing of goods and/or service to the target 26 may be provided to the consumer's device 30. If the recommendation is satisfactory to the consumer, the goods and/or service may be provided to the target 26 by the consumer or an intermediary hired by the consumer.

It should be understood that while computer system 10 is shown separate from the consumer's device 30, it is within the scope of the exemplary embodiments for the computer system 10 to be incorporated within the consumer's device 30. In this exemplary embodiment, permission will not need to be granted for computer system 10 to access the consumer's calendar 24.

Figure 2:
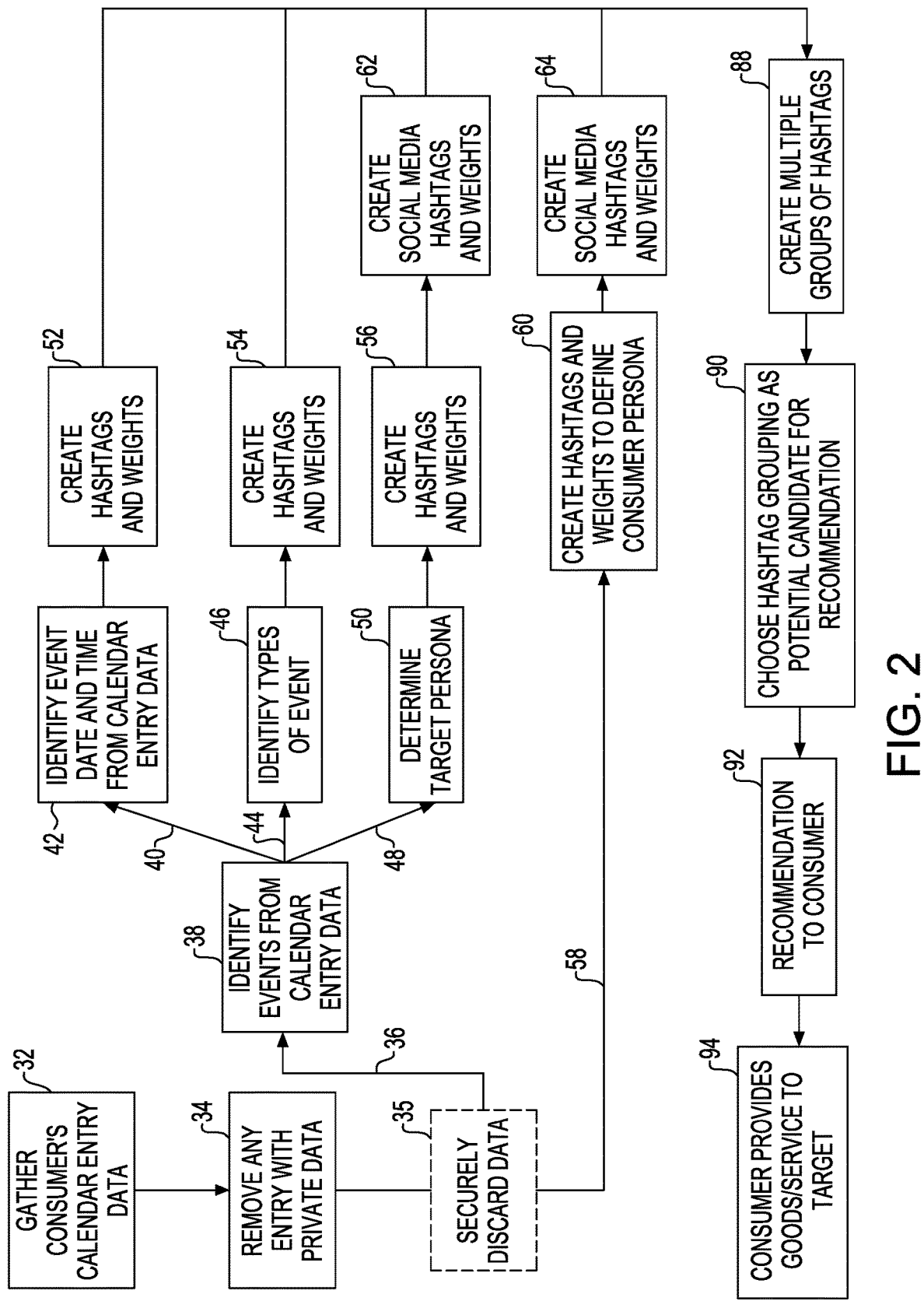
FIG. 2 is a flow chart illustrating the exemplary embodiments.
Figure 3:
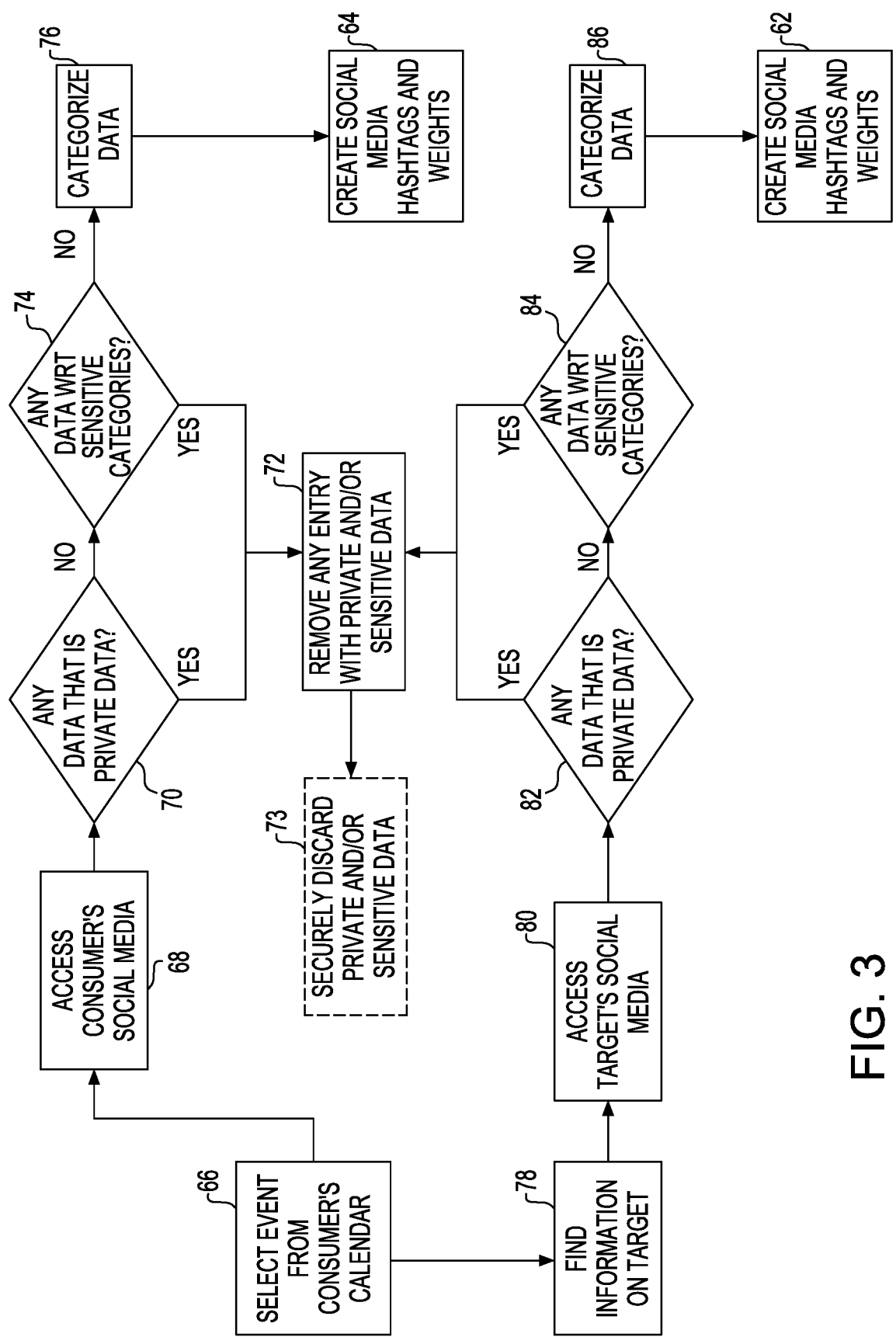
FIG. 3 is a flow chart illustrating in more detail a portion of FIG. 2.

FIGS. 2 and 3 illustrate a flow chart for the exemplary embodiments. Referring first to FIG. 2, a consumer's calendar entry data is gathered, box 32, by recommendation program 19 of the computer system 10.

After the consumer's calendar entry data is gathered, any private data is removed and discarded, box 34. The private data, in one exemplary embodiment, is marked with a restrictive marking or, in another embodiment, is not marked but considered to be all data in the calendar entry except for data that is marked with a nonrestrictive marking such as "not private data" or "public data".

In one exemplary embodiment, the private data may be securely discarded or destroyed such as by permanently erasing and securely destroying the data, box 35. Some steps for securely discarding the private data may be overwriting it or encrypting it so as to make it inaccessible. Securely discarding the data may be important to avoid the private data from ever becoming public such as by a computer breach of the computer system 10. Data remanence is the residual representation of digital data that remains even after attempts have been made to remove or erase the data. This residue may result from data being left intact by a nominal file deletion operation. Accordingly, the additional steps may be taken to securely discard the data.

After removing and discarding any private data, the process may proceed down path 36 to identify events from the calendar entry data, box 38. These events may be past events, present events and/or future events. Some such events may be, for example, a wedding, anniversary, birthday, festival, holiday, retirement, baby shower, etc. Information in the calendar entry data may be, for example, a title of the event, location of the event, date of the event, time of the event and invitees to the event.

In one exemplary embodiment, the process may be divided into multiple paths, In one path 40, the event date, time and location of each event may be identified from the previously identified events, block 42. For example, the event date could be Nov. 25, 2019, the location could be Manhattan, N.Y. and the time could be 6:00 PM.

In another path 44, the type of event may be identified, block 46. For example, the event may be a birthday party for John Smith.

In a further path 48, the target's persona (i.e., information about the target) may be determined, block 50. For example, since the birthday party is for John Smith, John Smith would be the target. From the consumer's calendar 24, or perhaps an address book 25 hosted on the consumer's computer device 30, information about the target may be learned such as the target's email, phone number(s), address, etc. All the information about the target makes up the target's persona.

The multiple paths 40, 44, 48 may be desirable for the following reasons. One path may be desired for determining the event types. Sometimes the consumer may not have the event mentioned explicitly on his/her calendar entry, In that case, there is the need to discover or guess the event type. Another reason is there are certain events that may fall under the same event category. This will help to better search the advertisement recommendation based on the type or category of event.

Hashtags may be determined to define an event's time, location, date, etc. from block 42, the type of event from block 46 and the target's persona from block 50. Weights may also be assigned to the hashtags.

Information about the consumer, that is the consumer's persona, may be known from access to the consumer's calendar 24. The consumer may also voluntarily provide information to the computer system 10 such as the consumer's age, marital status, occupation, education and interests, in a consumer persona profile 27 on the consumer's device 30 to which the computer system 10 may have access. Computer system 10 may also search the Internet for public information about the consumer. After removing and discarding any consumer private data in block 34, path 58 may be followed to define hashtags and weights for the consumer persona, block 60. In one exemplary embodiment, the consumer's private data may be securely discarded or destroyed such as by permanently erasing and securely destroying the data, box 35. Some steps for securely discarding the private data may be overwriting it or encrypting it so as to make it inaccessible. Securely discarding the data may be important to avoid the consumer's private data from ever becoming public such as by a computer breach of the computer system 10.

The hashtags as previously mentioned are equivalent to keywords. All of the information pertaining to the events, the target persona and the consumer persona may be processed, for example, by natural language processing (NLP) to extract hashtags (or keywords) representative of the information pertaining to the events, the target persona and the consumer persona. For example, the consumer's calendar entry data may say: "John Smith's birthday party is being held in Manhattan, N.Y. on Nov. 25, 2019, at 6:00 PM." Through NLP, the hashtags may be: Event: birthday party; Target: John Smith; Location: Manhattan, N.Y.; Time: evening, night. Time may be given the two hashtags because it may be important to categorize the event time of 6:00 PM as evening or night. These hashtags would be distributed among blocks 52, 54 and 56.

Weights may also be qualitatively assigned to the hashtags as an indication of how representative the hashtags are of the information. For example, the hashtag for the event, namely "birthday party", may be assigned a weight of 1.0 because it is exactly representative of the event. The hashtags of evening and night for the time may be assigned weights of 0.95 and 0.8 because the time of 6:00 PM is considered to be more in the evening than at night.

The process may continue by creating social media hashtags for the target, box 62, and creating social media hashtags for the consumer, box 64. The processes for creating these hashtags is described in more detail in FIG. 3.

Referring now to FIG. 3, an event may be selected from the consumer's calendar 24, box 66. It is this event and information pertaining to the event from which hashtags will be created.

The consumer's social media accounts may be accessed to query relevant data about the consumer, box 68. For the purpose of illustration and not limitation, the consumer's social media accounts may include Facebook®, Instagram®, Twitter®, YouTube®, Pinterest®, Tumblr®, Reddit® and LinkedIn®. The consumer's social media accounts may be noted in the consumer's calendar 24 or otherwise available from the consumer's profile 27 to which the computer system 10 has been given access.

From the consumer's social media accounts, there may be a wealth of information about the consumer some of which the consumer may wish to keep private. Accordingly, in decision block 70, any information that is private data follows the "YES" path and is removed as indicated in block 72. As previously described, private data in the consumer's social media accounts may be marked with a restrictive marking or all information in consumer's social media accounts may be considered to be private data except for information that is marked "not private", "public data" or similar marking. Private data may be securely discarded as described previously, box 73.

After removing any private data, the "NO" path is followed for the remaining data found from the consumer's social media accounts. In decision block 74, any information that while not being private data is sensitive to the consumer may be removed by following the "YES" path and is removed as indicated in block 72. Some information that the consumer may select as being sensitive may be the consumer's age, relationships, race, culture, political views, etc. Information that the consumer views as sensitive data may be noted by keywords in the consumer's profile. Sensitive data may be securely discarded as described previously, box 73.

After removing any sensitive data, the "NO" path is followed for the remaining data found from the consumer's social media accounts and then may be categorized, block 76. Some categories that may be used to categorize the data may be: Age, Geography, Occupation, Place of employment, Education, Sex, Marital status, Family, Places lived, Places visited, Life events, Food interests, Sports interests and Holiday destinations. It should be understood that this listing of categories is non-exclusive and there are many more categories available for categorizing the data.

The categorized data in block 76 may be processed by, for example, NLP to arrive at the social media hashtags for the consumer in block 64. Weights may be qualitatively assigned to the hashtags if desired.

Still referring to FIG. 3, the process for creating social media hashtags for the target, box 62, is now described in more detail.

An event may be selected from the consumer's calendar 24, box 66, and information pertaining to the target 26 may be found, box 78. Information pertaining to the target may be, for example, the target's name, email address, phone number(s) and social media links. To find some of this information about the target 26, the consumer's address book 25 (or other location) on the consumer's computer device 30 may need to be consulted. It is this event and information pertaining to the event from which hashtags will be created.

The target's social media accounts are accessed to query relevant data about the target, box 80. The target's social media accounts may be obtained from the social media links found previously in box 78. For the purpose of illustration and not limitation, the target's social media accounts may include Facebook®, Instagram®, Twitter®, YouTube®, Pinterest®, Tumblr®, Reddit® and LinkedIn®.

From the target's social media accounts, there may be a wealth of information about the target some of which the target may wish to keep private. Accordingly, in decision block 82, any information that is private data follows the "YES" path and is removed as indicated in block 72. As previously described, private data in the target's social media accounts may be marked with a restrictive marking or all information in the target's social media accounts may be considered to be private data except for information that is marked "not private", "public data" or similar marking. Private data may be securely discarded as described previously, block 73.

After removing any private data, the "NO" path is followed for the remaining data found from the target's social media accounts. In decision block 84, any information that while not being private data is sensitive to the target may be removed by following the "YES" path and is removed as indicated in block 72. Some information that the consumer may select on behalf of the target as being sensitive may be the target's age, relationships, race, culture, political views, etc. The target should mark the information as sensitive or the computer system 10 may recognize the information as sensitive based on the target and consumer relationship using social network analysis. For example, it may be typical in social media that some information about the target can only be accessible to family, friends or a special group and the target usually determines who can have access to what information. Sensitive data may be securely discarded as described previously, block 73.

After removing any sensitive data, the "NO" path is followed for the remaining data found from the target's social media accounts and then may be categorized, block 86. Some categories that may be used to categorize the data may be: Age, Geography, Occupation, Place of employment, Education, Sex, Marital status, Family, Places lived, Places visited, Life events, Food interests, Sports interests and Holiday destinations. It should be understood that this listing of categories is non-exclusive and there are many more categories available for categorizing the data.

The categorized data in block 86 may be processed by NLP, for example, to arrive at the social media hashtags for the target in block 62. Weights may be qualitatively assigned to the hashtags if desired.

Returning now back to FIG. 2, all of the hashtags created may then be grouped together to create multiple groups of hashtags, box 88. The hashtags may be grouped according to similarities and relationships of the consumer and the target. Each group of hashtags should have hashtags representing event date, event time, event type, consumer persona, target persona and target defining characteristics. If strong similarities in interests and relationships between the consumer and the target can be identified, these similarities and relationships can be more valuable when offering a recommendation for goods and/or service recommendation. The hashtags may be grouped according to the similarities and relationships and a group of hashtags should be representing event, consumer, and target defining characteristics.

A hashtag grouping may then be chosen as a potential candidate to be matched with a recommendation for goods and/or service, box 90. The hashtag grouping chosen may be the one having the strongest similarities and relationships between the consumer and the target. For example, one hashtag grouping may be age and interests where the consumer and the target are close in age and are both interested in ethnic foods and wine. Another hashtag grouping may marital status and family where the consumer and the target are both married and both have one or more children that are newborns.

Possible advertisement recommendations may also be defined by hashtags. Each group of hashtags defined previously in box 88 will look for a match with advertisement recommendation hashtags. The match selected may be the one with the strongest similarities and relationships between these two "groups of hashtags", one group representing the advertisements and the other group representing the event date, event time, event type, consumer persona, target persona and target defining characteristics. The advertisements that have higher similarities or matches will be used as advertisement recommendations to the consumer, box 92.

The recommendation may be made to the consumer, box 92, and if the recommendation is acceptable to the consumer, the consumer may provide, or have another party, provide the goods and/or service to the target, box 94.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of goods/service recommendation comprising:
    accessing a consumer's computerized calendar to retrieve calendar data of the consumer and identifying at least one event in the calendar data;
    removing and discarding any calendar data that is data that is to be restricted from public disclosure;
    determining first key words of the event, the first key words being representative of the event;
    identifying a target from the event, the target being mentioned in the event;
    determining second key words of the target, the second key words being descriptive of the target;
    determining third key words of the calendar data, the third key words being descriptive of the consumer;
    combining the first, second and third key words;
    determining similarities and relationships between the target and the consumer to find groups of key words that form the strongest similarities and relationships;
    identifying the group of key words as having the strongest similarities and relationships between the target and the consumer;
    using the group of key words having the strongest similarities between the target and the consumer to identify a recommendation for providing a goods/service to the target; and
    providing the recommendation to the consumer for the goods/service to the target.

2. The method of claim 1 further comprising:
    accessing social media for each of the target and the consumer;

removing and discarding any social media data of the target and the consumer that is data that is to be restricted from public disclosure;

determining fourth key words pertaining to the social media data for the consumer, the fourth key words being descriptive of the consumer on social media; and determining fifth key words pertaining to the social media data for the target, the fifth key words being descriptive of the target on social media; and wherein the step of combining the first, second and third key words further includes the fourth and fifth key words.

3. The method of claim 2 wherein determining the first through fifth key words is by natural language processing.

4. The method of claim 1 wherein the event includes at least an event name, a date of the event, a location of the event and a time of the event.

5. The method of claim 1 wherein data that is to be restricted from public disclosure has a restrictive marking to indicate that it is private data.

6. The method of claim 1 wherein all calendar data is data that is to be restricted from public disclosure except calendar data that has a marking indicating no restriction on disclosure of the calendar data.

7. The method of claim 1 wherein the recommendation is in the form of an advertisement.

8. A computer program product for goods/service recommendation comprising a computer readable storage medium having program instructions embodied therewith by a processor to cause the processor to perform a method comprising:

accessing a consumer's computerized calendar by the processor to retrieve calendar data of the consumer and identifying at least one event in the calendar data;

removing and discarding any calendar data by the processor that is data that is to be restricted from public disclosure;

determining first key words of the event by the processor, the first key words being representative of the event;

identifying a target from the event by the processor, the target being mentioned in the event;

determining second key words of the target by the processor, the second key words being descriptive of the target;

determining third key words of the calendar data by the processor, the third key words being descriptive of the consumer;

combining the first, second and third key words by the processor;

determining similarities and relationships between the target and the consumer by the processor to find groups of key words that form the strongest similarities and relationships;

identifying the group of key words by the processor as having the strongest similarities and relationships between the target and the consumer;

using the group of key words by the processor having the strongest similarities between the target and the consumer to identify a recommendation for providing a goods/service to the target; and providing the recommendation by the processor to the consumer for the goods/service to the target.

9. The computer program product of claim 8 further comprising:

accessing social media by the processor for each of the target and the consumer;

removing and discarding any social media data by the processor of the target and the consumer that is data that is to be restricted from public disclosure;

determining fourth key words pertaining to the social media data by the processor for the consumer, the fourth key words being descriptive of the consumer on social media; and determining fifth key words pertaining to the social media data by the processor for the target, the fifth key words being descriptive of the target on social media; and wherein the step of combining the first, second and third key words further includes the fourth and fifth key words.

10. The computer program product of claim 9 wherein determining the first through fifth key words is by natural language processing.

11. The computer program product of claim 8 wherein the event includes at least an event name, a date of the event, a location of the event and a time of the event.

12. The computer program product of claim 8 wherein data that is to be restricted from public disclosure has a restrictive marking to indicate that it is private data.

13. The computer program product of claim 8 wherein all calendar data is data that is to be restricted from public disclosure except calendar data that has a marking indicating no restriction on disclosure of the calendar data.

14. The computer program product of claim 8 wherein the recommendation is in the form of an advertisement.

15. A system for goods/service recommendation comprising:

a nontransitory storage medium; and a processor that executes the instructions to perform the following functions:

accessing a consumer's computerized calendar to retrieve calendar data of the consumer and identifying at least one event in the calendar data;

removing and discarding any calendar data that is data that is to be restricted from public disclosure;

determining first key words of the event, the first key words being representative of the event;

identifying a target from the event, the target being mentioned in the event;

determining second key words of the target, the second key words being descriptive of the target;

determining third key words of the calendar data, the third key words being descriptive of the consumer;

combining the first, second and third key words;

determining similarities and relationships between the target and the consumer to find groups of key words that form the strongest similarities and relationships;

identifying the group of key words as having the strongest similarities and relationships between the target and the consumer;

using the group of key words having the strongest similarities between the target and the consumer to identify a recommendation for providing a goods/service to the target; and providing the recommendation to the consumer for the goods/service to the target.

16. The system of claim 15 further comprising the processor to perform the following additional functions:

accessing social media for each of the target and the consumer;

removing and discarding any social media data of the target and the consumer that is data that is to be restricted from public disclosure;

determining fourth key words pertaining to the social media data for the consumer, the fourth key words being descriptive of the consumer on social media; and determining fifth key words pertaining to the social media data for the target, the fifth key words being descriptive of the target on social media; and wherein the step of combining the first, second and third key words further includes the fourth and fifth key words.

17. The system of claim 15 wherein the event includes at least an event name, a date of the event, a location of the event and a time of the event.

18. The system of claim 15 wherein data that is to be restricted from public disclosure has a restrictive marking to indicate that it is private data.

19. The system of claim 15 wherein all calendar data is data that is to be restricted from public disclosure except calendar data that has a marking indicating no restriction on disclosure of the calendar data.

20. The system of claim 15 wherein the recommendation is in the form of an advertisement.

\* \* \* \* \*